(12) United States Patent
Kang et al.

(10) Patent No.: US 7,405,022 B2
(45) Date of Patent: Jul. 29, 2008

(54) SECONDARY BATTERY PACK HAVING CONFIGURATION OF ALTERNATIVE ORIENTATION

(75) Inventors: Juhyun Kang, Seo-gu Daejeon (KR); JongMin Park, Daejeon (KR); Yeo Won Yoon, Seo-gu Daejeon (KR); Do Yang Jung, Hwaseong-si (KR)

(73) Assignee: LG Chem, Ltd. (KR)

( * ) Notice: Subject to any disclaimer, the term of this patent is extended or adjusted under 35 U.S.C. 154(b) by 450 days.

(21) Appl. No.: 11/273,961

(22) Filed: Nov. 13, 2005

(65) Prior Publication Data

US 2006/0159988 A1 Jul. 20, 2006

(30) Foreign Application Priority Data

Nov. 15, 2004 (KR) .................. 10-2004-0092887

(51) Int. Cl.
*H01M 6/42* (2006.01)
(52) U.S. Cl. ...................................... 429/158; 429/156
(58) Field of Classification Search ................ 429/156, 429/158
See application file for complete search history.

*Primary Examiner*—Patrick Ryan
*Assistant Examiner*—Thomas H. Parsons
(74) *Attorney, Agent, or Firm*—Cantor Colburn LLP

(57) ABSTRACT

Disclosed herein is a secondary battery pack including a plurality of cartridges. Each of the cartridges has a plurality of unit cells mounted therein. The cartridges are stacked one on another in an alternate orientation structure in which electrode terminals of the neighboring cartridges are not located on the same plane when the cartridges are electrically connected to each other, thereby accomplishing easy and safe electrical connection between the cartridges.

8 Claims, 4 Drawing Sheets

SECONDARY BATTERY PACK HAVING CONFIGURATION OF ALTERNATIVE ORIENTATION

FIELD OF THE INVENTION

The present invention relates to a secondary battery pack having an alternate orientation structure, and, more particularly, to a secondary battery pack including a plurality of cartridges, each of which has a plurality of unit cells mounted therein and which are stacked one on another such that electrode terminals of the neighboring cartridges are not located on the same plane when the cartridges are electrically connected to each other, thereby accomplishing easy and safe electrical connection between the cartridges.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel.

Small-sized mobile devices use one or more unit cells, for example, three or four unit cells, for each device. To the contrary, medium- or large-sized devices, such as vehicles, use a battery pack comprising a plurality of unit cells electrically connected with each other as a high-output, large-capacity battery is required.

Generally, a plurality of unit cells, which are connected in series or parallel with each other, are mounted in a cartridge, and a plurality of such cartridges are electrically connected with each other. In this way, a battery pack is manufactured.

FIG. 1 is a perspective view illustrating an exemplary structure of a cartridge having four unit cells mounted therein.

Referring to FIG. 1, the cartridge 100 comprises a pair of frames 120 and 122, which are attached to each other. The unit cells 200 and 201 are located in cell partitions 130 of the frames 120 and 122 while the frames 120 and 122 are separated from each other, and are then securely fixed at the cell partitions 130 of the frames 120 and 122 after the frames 120 and 122 are attached to each other. The unit cell 200 has an electrode lead (not shown), which is electrically connected to that of a neighboring unit cell 201 via a bus 140 located at the upper part of the cartridge 100. As shown in FIG. 1, the unit cells 200 and 201 are connected in series with each other, although the unit cells may be connected in parallel with each other. The unit cells are electrically connected to a cathode terminal 150 and an anode terminal 160, which protrude at opposite sides of the upper end of the cartridge 10, respectively.

FIG. 2 is a typical view illustrating the electrical connection of cartridges in a conventional battery pack.

Referring to FIG. 2, a plurality of unit cells (not shown) are mounted in each of the cartridges 101, 102, 103 . . . 110 in the same fashion as shown in FIG. 1. The cartridge 101 is provided at opposite sides of the upper end thereof with a cathode terminal 151 and an anode terminal 161. To accomplish the electrical connection between the cartridges 101, 102, 103 . . . 110, the first cartridge 101 is stacked on the second cartridge 102 while the first cartridge 101 and the second cartridge 102 face each other such that the cathode terminal 151 of the first cartridge 101 is adjacent to an anode terminal 162 of the second cartridge 102. The electrical connection between the cartridges 101, 102, 103 . . . 110 is performed by bus bars 170.

The bus bars 170 are fixed to the respective terminals of the cartridges by welding. Also, the second cartridge 102 is stacked on the third cartridge 103 while the second cartridge 102 and the third cartridge 103 face each other such that a cathode terminal 152 of the second cartridge 102 is adjacent to an anode terminal 163 of the third cartridge 103. In the same manner, the other cartridges 104 . . . 110 are stacked one on another in order while the cartridges 104 . . . 110 face each other. The anode terminal 161 of the first cartridge 101 and a cathode terminal 150 of the last cartridge 110 are connected to a battery management system (BMS), which is not shown in the drawings. The cartridges 101, 102, 103 . . . 110 are stacked one on another while the cartridges 101, 102, 103 . . . 110 face each other as described above, and therefore, a high-output battery pack 300 having a plurality of unit cells connected in series with each other is completed.

However, the battery pack 300 with the above-described structure has the following problems because the connection length between the terminals 151 and 162 of the two neighboring cartridges (for example, the cartridges 101 and 102) is very small, and the distance between a terminal connection part (first connection part) 401 for connecting the terminals of the neighboring cartridges 101 and 102 and another terminal connection part (second connection part) 402 for connecting the terminals of the neighboring cartridges 103 and 104 is also very small.

First, it is difficult to connect the terminals. The thickness of each cartridge is nearly equal to that of the unit cell. As a result, the connection length between the terminals of the neighboring cartridges is very small when the cartridges are stacked one on another. Consequently, a process of connecting the terminals, which are very close to each other, and a process of forming the terminal connection parts without affecting the neighboring terminal connection parts are time-consuming and require high precision, thereby significantly reducing the manufacturing efficiency of the battery pack.

Secondly, when the terminals are connected with each other using electric wires, the structure of the battery pack is very complicated. Furthermore, the electric wires may be connected to each other, and therefore, interference between the electric wires occurs.

Thirdly, the terminal connection parts are concentrated at one side of the battery pack. As a result, the second terminal connection part must be formed in the vicinity of the first terminal connection part. Consequently, a possibility of electric shock is very high.

As described above, the conventional battery pack has several structural problems, and therefore, a battery pack having a new structure solving the problems is required.

SUMMARY OF THE INVENTION

Accordingly, it is an object of the present invention to substantially obviate the above-mentioned problems of the conventional arts as well as the technical problems requested from the past.

The inventors have performed various experiments and research, and have found that, when first and second cartridges are stacked one on another such that the orientation angle between electrode terminals of the first and second cartridges is 90 degrees or more, electrode terminals of a third cartridge, which is adjacent to the second cartridge, are arranged in the same orientation as the electrode terminals of the first cartridge, the electrode terminals of the first and third cartridges, which are arranged in the same orientation, are electrically connected to each other, and the electrode terminals of the second cartridge are electrically connected to electrode terminals of fourth cartridge, which is arranged in the same orientation as the second cartridge and adjacent to the third cartridge, the connection length between the connected terminals and the distance between terminal connection parts are increased by the thickness of one cartridge, and the terminal connection parts are not concentrated at one side of the battery pack, and as a result, the battery pack is easily manufactured, the manufacturing efficiency is increased, and safety during the manufacture of the battery pack is significantly improved.

In accordance with the present invention, the above and other objects can be accomplished by the provision of a battery pack including a plurality of cartridges, which are stacked one on another while the cartridges are electrically connected with each other, wherein the cartridges are stacked in an alternate orientation manner, in which electrode terminals of a second one of the cartridges adjacent to a first one of the cartridges are arranged at an angle of 90 degrees or more to electrode terminals of the first one of the cartridges, and electrode terminals of a third one of the cartridges adjacent to the second one of the cartridges are arranged in the same orientation as the electrode terminals of the first one of the cartridges, and wherein the electrode terminals of the first one of the cartridge are electrically connected to the electrode terminals of the third one of the cartridges, respectively, the electrode terminals of the second one of the cartridge are electrically connected to electrode terminals of a fourth one of the cartridges, respectively, and electrode terminals of the last one of the cartridges are electrically connected to electrode terminals of the neighboring one of the cartridges, respectively.

Preferably, the orientation angle between the electrode terminals of the neighboring cartridges is 180 degrees. In this case, the first cartridge and the second cartridge are stacked one on another such that the front part of the second cartridge is adjacent to the rear part of the first cartridge. Consequently, the alternate 180-degree orientation of the cartridges is easily accomplished.

The number of the cartridges stacked in the battery pack is not particularly restricted. The number of the cartridges is set in response to desired battery output. For example, 4 to 20 cartridges may be stacked one on another to constitute a battery pack.

Also, the structure of the cartridges is not restricted so long as a plurality of unit cells are mounted in each cartridge while the unit cells are electrically connected with each other. The number of the unit cells mounted in each cartridge is not particularly restricted. The unit cells mounted in each cartridge may be connected either in series, or the unit cells may be connected in parallel after the unit cells are connected in series. Preferably, the unit cells are connected either in series with each other.

The unit cells mounted in each cartridge are cells that can be charged and discharged. Preferably, square-shaped cells or pouch-shaped cells, which accumulate electricity in high density, are used as the unit cells. More preferably, the pouch-shaped cells are used as the unit cells.

Each of the unit cells has a cathode, an anode, a separation film, and an electrolyte mounted in a sealed cell case. An electrode assembly including a minute porous separation film between thin film-shaped cathode and anode may be wound, or fullcells or bicells of cathode/separation film/anode structure may be sequentially stacked one on another. Active materials applied to the cathode and the anode are not particularly restricted. Preferably, the cathode active material consists of lithium manganese-based oxide having high safety, and the anode active material consists of carbon. The preferable unit cell is a lithium-ion cell or a lithium-ion polymer cell.

The electric connection between the electrode terminals of the cartridges is made using conductive metal bars, electric wires, or a printed circuit board, which are fixed to the corresponding electrode terminals, for example, by welding, riveting, or screwing. The electrode terminals of the cartridges may be electrically connected in series, or the electrode terminals of the cartridges may be electrically connected in parallel after the electrode terminals of the cartridges are electrically connected in series. Preferably, the electrode terminals of the cartridges are electrically connected in series with each other.

The last one (the $n^{th}$ cartridge) of the cartridges stacked in the alternate orientation manner is electrically connected to the neighboring cartridge (n-$1^{th}$ cartridge). In this way, the cartridges having different orientations are electrically connected to each other, and therefore, a battery pack is completed.

The battery pack according to the present invention is used as a high-output, large-capacity power source. Preferably, the battery pack is used as a power source for electric vehicles or hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE NUMERALS OF THE DRAWINGS

Figure 1:
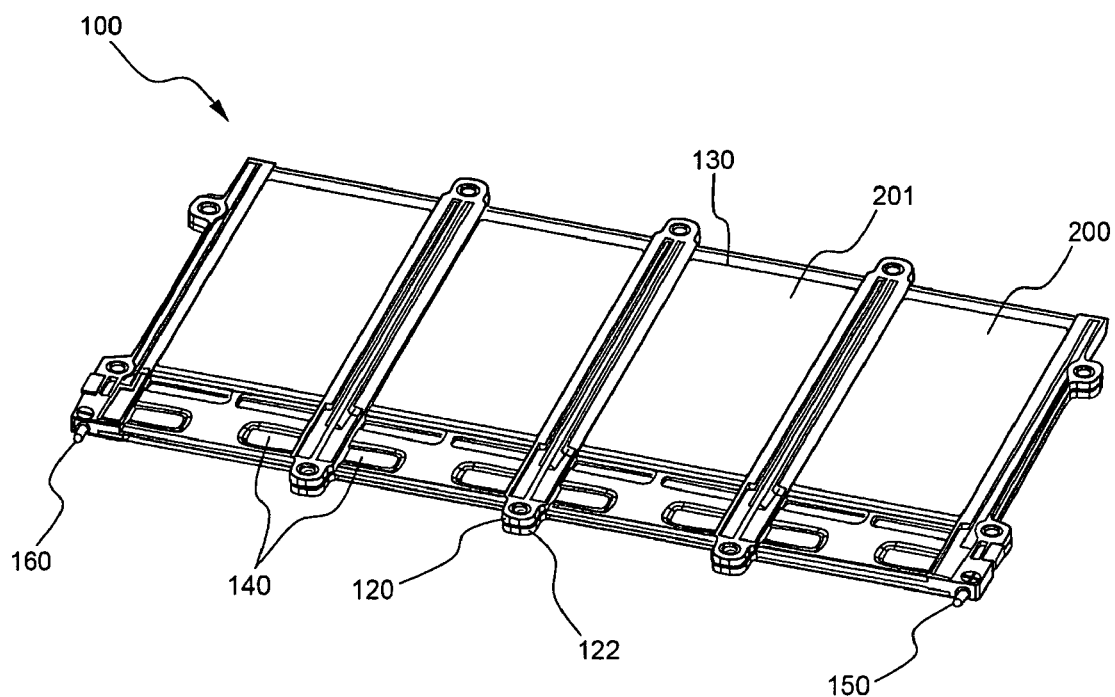
FIG. 1 is a perspective view illustrating a cartridge having unit cells mounted therein.

100, 101, 102, 103, 104: cartridges
120, 122: cartridge frames
150, 151, 152, 153, 154: cathode terminals
161, 162, 163, 164, 165: anode terminals
170, 171: bus bars
200. 202: unit cells
300: battery pack
401, 402: terminal connection parts

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 3:
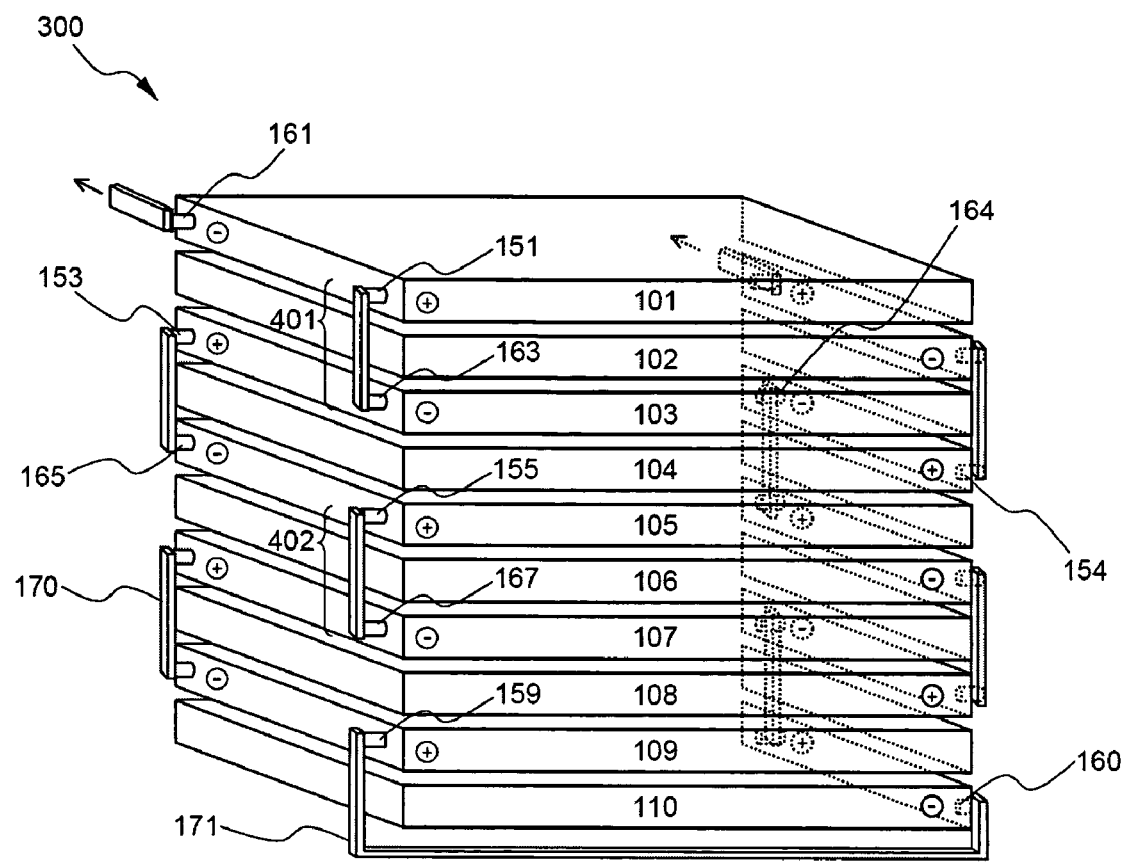
FIG. 3 is a typical view illustrating the electrical connection of cartridges in a battery pack according to an embodiment of the present invention.
Figure 4:
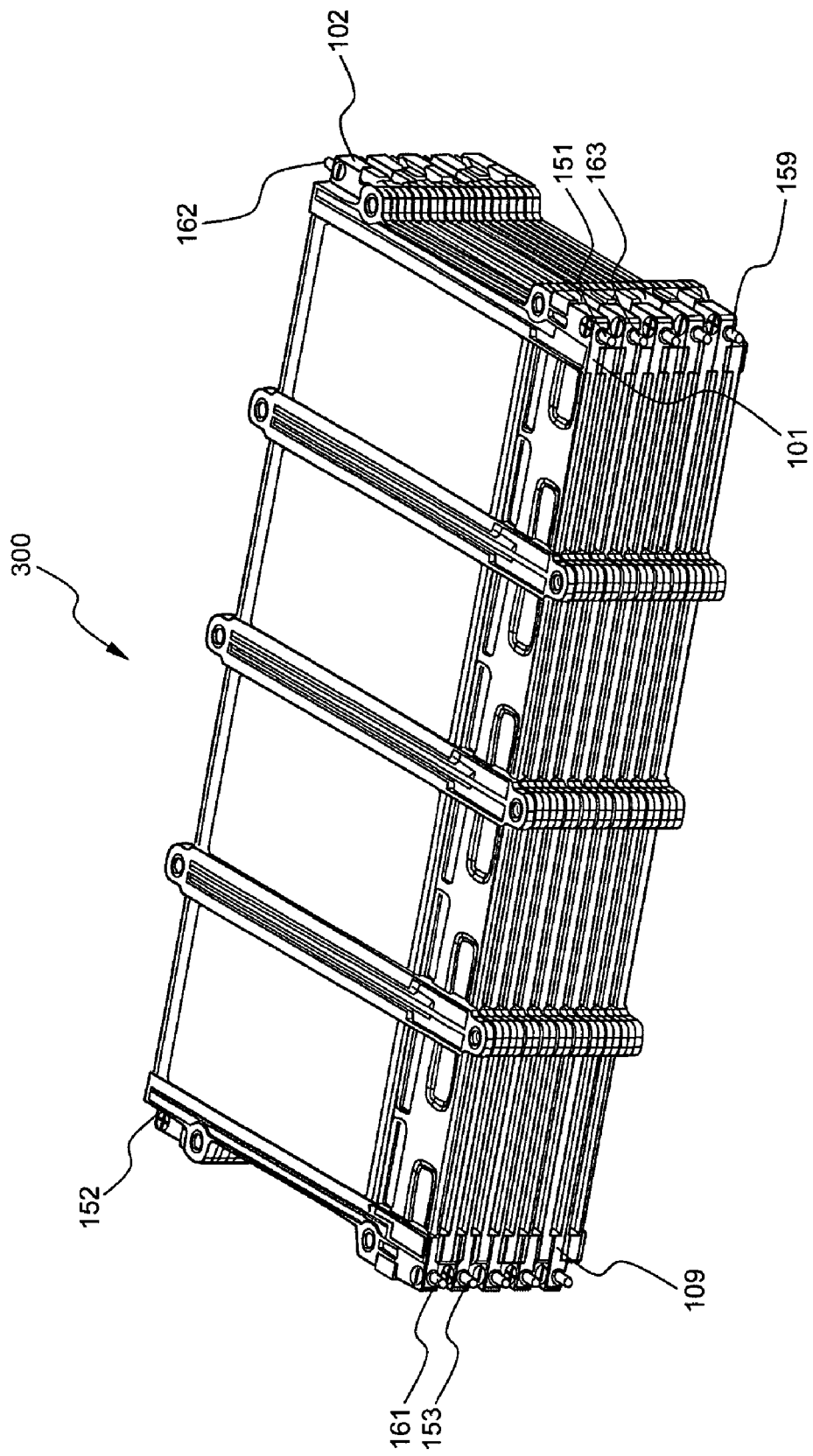
FIG. 4 is a perspective view illustrating a battery pack constituted by stacking cartridges, one of which is shown in FIG. 1, in the structure shown in FIG. 3.

FIG. 3 is a typical view illustrating the electrical connection of cartridges in a battery pack according to an embodiment of the present invention, and FIG. 4 is a perspective view illustrating a battery pack constituted by stacking cartridges, one of which is shown in FIG. 1, in the structure shown in FIG. 3. To assist easy understanding, the cartridges shown in FIG. 4 are not electrically connected with each other.

Referring to FIGS. 3 and 4, the battery pack 300 includes ten cartridges, which are connected in series with each other in an alternate 180-degree orientation manner. Specifically, electrode terminals 151 and 161 of a first cartridge 101 and electrode terminals 152 and 162 of a second cartridge 102 are arranged in opposite orientations. On the other hand, electrode terminals 153 and 163 of a third cartridge 103 and the electrode terminals 151 and 161 of the first cartridge 101 are arranged in the same orientation. Also, electrode terminals 154 and 164 of a fourth cartridge 103 and the electrode terminals 152 and 162 of the second cartridge 102 are arranged in the same orientation. Such alternate orientations of the electrode terminals are the same for all the cartridges. Consequently, the electrode terminals of the odd-numbered cartridges 101, 103, 105, 107, and 109 and the electrode terminals of the even-numbered cartridges 102, 104, 106, 108, and 110 are arranged in the alternate 180-degree orientation manner.

Figure 2:
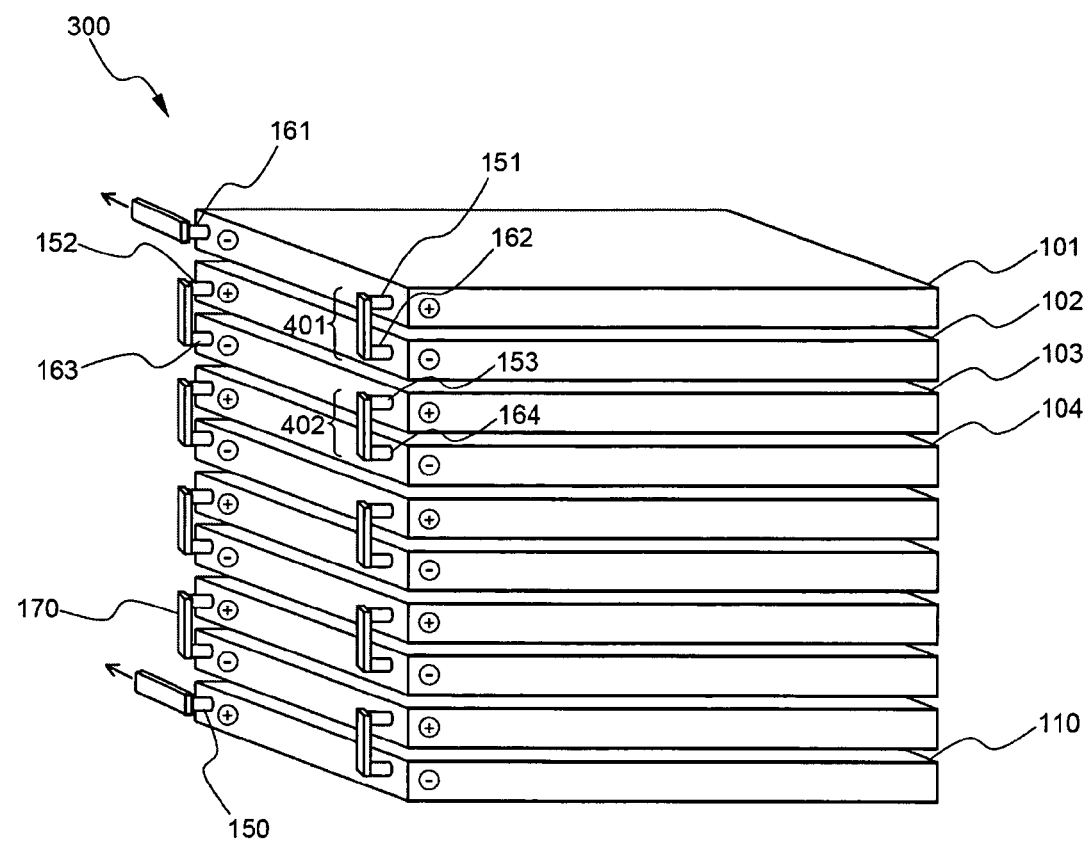
FIG. 2 is a typical view illustrating the electrical connection of cartridges in a conventional battery pack.

The anode terminal 161 of the first cartridge 101 is connected to a battery management system (BMS), which is not shown in the drawings. The cathode terminal 151 of the first cartridge 101 is connected to the anode terminal 163 of the third cartridge 103 via a bus bar 170. The cathode terminal 153 of the third cartridge 103 is connected to the anode terminal 165 of the fifth cartridge 105. Consequently, the connection length between the terminals (for example, terminals 151 and 163) is greater by the thickness of at least one cartridge than that as in shown in FIG. 2. Also, the distance between the first terminal connection part 401 and the second terminal connection part 402 is greater by the thickness of at least one cartridge than that as in shown in FIG. 2. As described above, the connection length between the electrode terminals and the distance between the terminal connection parts are increased, and therefore, the connection of the electrode terminals is easily performed, and interference between the connection members is minimized.

While the first cartridge 101, the third cartridge 103, the fifth cartridge 105, the seventh cartridge 107, and the ninth cartridge 109 are electrically connected with each other, the cathode terminal 159 of the fifth cartridge 109 is connected to the anode terminal 160 of the tenth cartridge 110, which is arranged in the orientation opposite to the cathode terminal 159 of the fifth cartridge 109. This connection is performed using a modified bus bar 171, which is elongated. The shape of the bus bar 171 is not restricted so long as the ninth cartridge 109 and the tenth cartridge 110 are electrically connected with each other by the bus bar 171.

The electrical connection between the tenth cartridge 110, the eighth cartridge 108, the sixth cartridge 106, the fourth cartridge 104, and the second cartridge 102 are accomplished in the same manner as the above description. Finally, the cathode terminal 152 of the second cartridge 102 is connected to the BMS (not shown).

Consequently, the terminal connection parts of the cartridges are distributed at the opposite sides of the battery pack 300, and therefore, the battery pack can be easily manufactured while a possibility of electric shock is significantly decreased.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery pack according to the present invention is constructed such that the electrode terminals of the neighboring cartridges are arranged in an alternate 90-degree or more orientation manner, preferably, in an alternate 180-degree orientation manner. Consequently, the connection length between the electrically connected terminals and the distance between the terminal connection parts are increased by the thickness of at least one cartridge, and therefore, the connection between the cartridges is easily performed while interference between the connection members is prevented. Furthermore, the terminal connection parts are not concentrated at one side of the battery pack, and therefore, a possibility of electric shock is significantly decreased.

What is claimed is:

1. A battery pack including a plurality of cartridges, which are stacked one on another while the cartridges are electrically connected with each other,
   wherein the cartridges are stacked in an alternate orientation manner, in which electrode terminals of a second one of the cartridges adjacent to a first one of the cartridges are arranged at an angle of 90 degrees or more to electrode terminals of the first one of the cartridges, and electrode terminals of a third one of the cartridges adjacent to the second one of the cartridges are arranged in the same orientation as the electrode terminals of the first one of the cartridges, and
   wherein the electrode terminals of the first one of the cartridge are electrically connected to the electrode terminals of the third one of the cartridges, respectively, the electrode terminals of the second one of the cartridge are electrically connected to electrode terminals of a fourth one of the cartridges, respectively, and electrode terminals of the last one of the cartridge are electrically connected to electrode terminals of the neighboring one of the cartridges, respectively.

2. The battery pack as set forth in claim 1, wherein the orientation angle between the electrode terminals of the neighboring cartridges is 180 degrees.

3. The battery pack as set forth in claim 1, wherein each of the cartridges has unit cells mounted therein, the unit cells being square-shaped cells or pouch-shaped cells.

4. The battery pack as set forth in claim 3, wherein the unit cells are lithium-ion polymer cells.

5. The battery pack as set forth in claim 1, wherein each of the cartridges has unit cells mounted therein, the unit cells being connected in series, or the unit cells being connected in parallel after the unit cells are connected in series.

6. The battery pack as set forth in claim 1, wherein the electric connection between the electrode terminals of the cartridges is made by conductive metal bars, electric wires, or a printed circuit board.

7. The battery pack as set forth in claim 1, wherein the electrode terminals of the cartridges are electrically connected in series, or the electrode terminals of the cartridges are electrically connected in parallel after the electrode terminals of the cartridges are electrically connected in series.

8. The battery pack as set forth in claim 1, wherein the battery pack is used as a power source for high-output, large-capacity electric vehicles or hybrid electric vehicles.

* * * * *